United States Patent
Mishra et al.

(10) Patent No.: US 11,042,128 B2
(45) Date of Patent: Jun. 22, 2021

(54) METHOD AND SYSTEM FOR PREDICTING EQUIPMENT FAILURE

(71) Applicant: Accenture Global Services Limited, Dublin (IE)

(72) Inventors: Rabinarayan Mishra, Bangalore (IN); Akshay Jalihal, Pune (IN); Sandeep Verma, Uttar Pradesh (IN); Ram Gopal Varma Vegesna, Telangana (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 361 days.

(21) Appl. No.: 14/717,459

(22) Filed: May 20, 2015

(65) Prior Publication Data
US 2016/0274551 A1  Sep. 22, 2016

(30) Foreign Application Priority Data
Mar. 18, 2015 (IN) .......................... 1342/CHE/2015

(51) Int. Cl.
*G06F 17/10*  (2006.01)
*G05B 9/02*  (2006.01)
*G05B 15/02*  (2006.01)

(52) U.S. Cl.
CPC .............. *G05B 9/02* (2013.01); *G05B 15/02* (2013.01)

(58) Field of Classification Search
CPC .. G05B 23/0283; G05B 13/04; G05B 13/048; G05B 23/024; G05B 23/0229;
(Continued)

(56) References Cited

U.S. PATENT DOCUMENTS 5,210,704 A * 5/1993 Husseiny ............... G01H 1/003
                                                                    702/34
6,446,027 B1 * 9/2002 O'Keeffe ............... G01R 31/02
                                                                   702/183
(Continued)

OTHER PUBLICATIONS

Wu et al. Improved K-Nearest Neighbor Classification Pattern Recognition 35, 2002, 2311-2318.*
(Continued)

*Primary Examiner* — Rehana Perveen
*Assistant Examiner* — Cuong V Luu
(74) *Attorney, Agent, or Firm* — Brinks Gilson & Lione (57) ABSTRACT

A method for predicting equipment failure includes receiving parameter sample values associated with parameters of benchmark equipment and operational status information associated with the benchmark equipment. The parameter sample values and operational status information are periodically acquired. A model is generated for relating one or more of the parameters to benchmark equipment failure. For each parameter, a threshold value at which an output of the model indicates benchmark equipment failure is determined. Next, parameters of an equipment under test having parameter sample values that match the determined threshold values are determined. For each determined parameter, benchmark equipment having parameter sample values that match the parameter sample values of the equipment under test that match the determine threshold values are determined. Survivability data for the equipment under test is generated based on survivability data associated with the determined benchmark equipment. The generated survivability data is communicated to a user interface.

18 Claims, 8 Drawing Sheets

(58) Field of Classification Search
CPC ............ G05B 19/4065; G05B 23/0245; G05B 2223/06; G05B 23/0235; G05B 23/0254; G05B 23/0216; G05B 2219/37252; G05B 13/026; G05B 19/4184; G05B 2219/32128; G05B 2219/32235; G05B 23/0218; G05B 2219/32194; G05B 2219/34477; G05B 2219/37245; G05B 2219/37258; G05B 2219/50185; G05B 2219/50203; G05B 2219/372565

See application file for complete search history.

(56) References Cited

U.S. PATENT DOCUMENTS

| | | | | |
|---|---|---|---|---|
| 6,487,562 | B1* | 11/2002 | Mason, Jr. ............ | G06F 3/0605 |
| 6,735,549 | B2* | 5/2004 | Ridolfo .............. | G05B 23/0283 |
| | | | | 701/29.4 |
| 7,581,434 | B1* | 9/2009 | Discenzo ........... | G01N 33/2888 |
| | | | | 73/53.01 |
| 2004/0015329 | A1* | 1/2004 | Shayegan ............. | G09B 23/28 |
| | | | | 702/179 |
| 2005/0187649 | A1* | 8/2005 | Funk ................. | G05B 19/4184 |
| | | | | 700/121 |
| 2006/0271346 | A1 | 11/2006 | Lonn et al. | |
| 2007/0100724 | A1* | 5/2007 | Hollas ................ | G06Q 10/0635 |
| | | | | 705/36 R |
| 2008/0126049 | A1* | 5/2008 | Bailey ................ | F04D 15/0088 |
| | | | | 703/10 |
| 2008/0140361 | A1 | 6/2008 | Bonissone et al. | |
| 2008/0262820 | A1* | 10/2008 | Nasle .................... | G06Q 10/04 |
| | | | | 703/18 |
| 2008/0263469 | A1* | 10/2008 | Nasle ........................ | G06F 8/38 |
| | | | | 715/771 |
| 2009/0095657 | A1* | 4/2009 | Taha ...................... | C10G 11/05 |
| | | | | 208/113 |
| 2009/0240366 | A1* | 9/2009 | Kaushal ............ | G05B 13/0265 |
| | | | | 700/110 |
| 2009/0271157 | A1 | 10/2009 | Herman et al. | |
| 2010/0042327 | A1* | 2/2010 | Garvey .................. | E21B 47/00 |
| | | | | 702/11 |
| 2010/0076714 | A1* | 3/2010 | Discenzo ............... | H02N 2/181 |
| | | | | 702/104 |
| 2010/0082291 | A1* | 4/2010 | Wen .................. | H04B 10/0795 |
| | | | | 702/180 |
| 2010/0100337 | A1* | 4/2010 | Vichare ................ | G06F 11/008 |
| | | | | 702/34 |
| 2010/0257410 | A1* | 10/2010 | Cottrell .............. | G05B 23/0229 |
| | | | | 714/45 |
| 2010/0262442 | A1* | 10/2010 | Wingenter ............. | G06Q 10/04 |
| | | | | 705/7.38 |
| 2011/0071963 | A1* | 3/2011 | Piovesan ................ | G06Q 10/00 |
| | | | | 706/11 |
| 2011/0082597 | A1* | 4/2011 | Meagher ................... | H02J 3/38 |
| | | | | 700/291 |
| 2012/0123756 | A1* | 5/2012 | Wang ...................... | E21B 44/00 |
| | | | | 703/2 |
| 2012/0179326 | A1 | 7/2012 | Ghelam | |
| 2013/0127709 | A1* | 5/2013 | Spielberg .............. | G06F 3/0489 |
| | | | | 345/157 |
| 2013/0161097 | A1* | 6/2013 | Benson ..................... | E21B 7/04 |
| | | | | 175/26 |
| 2013/0258865 | A1* | 10/2013 | Kovvali ................ | H04W 24/10 |
| | | | | 370/241 |
| 2013/0311197 | A1* | 11/2013 | Hummer ............ | G06Q 30/0283 |
| | | | | 705/2 |
| 2014/0101058 | A1* | 4/2014 | Castel .................... | G06Q 10/20 |
| | | | | 705/305 |
| 2014/0257526 | A1* | 9/2014 | Tiwari ................... | G05B 13/02 |
| | | | | 700/29 |
| 2015/0051749 | A1* | 2/2015 | Hancock ................ | G06Q 50/06 |
| | | | | 700/295 |
| 2015/0135012 | A1* | 5/2015 | Bhalla ................... | H04L 41/147 |
| | | | | 714/26 |
| 2015/0160101 | A1* | 6/2015 | Gao ..................... | G01M 13/028 |
| | | | | 702/6 |
| 2015/0300892 | A1* | 10/2015 | Malhotra ............... | G01K 13/00 |
| | | | | 700/276 |
| 2015/0331585 | A1* | 11/2015 | Stading ............... | G06F 3/04842 |
| | | | | 715/810 |
| 2015/0378373 | A1* | 12/2015 | Sprinkle ............ | G05D 23/1917 |
| | | | | 700/276 |
| 2016/0078695 | A1* | 3/2016 | McClintic .............. | G06Q 10/06 |
| | | | | 701/29.4 |
| 2016/0189081 | A1* | 6/2016 | Gajdzinski ....... | G06Q 10/06393 |
| | | | | 705/7.39 |
| 2016/0217379 | A1* | 7/2016 | Patri ...................... | G06N 20/00 |
| 2016/0246906 | A1* | 8/2016 | Radibratovic ...... | G06F 17/5009 |
| 2017/0006135 | A1* | 1/2017 | Siebel .................... | H04L 67/02 |
| 2017/0192398 | A1* | 7/2017 | Nasle .................... | G06Q 10/04 |
| 2018/0255410 | A1* | 9/2018 | Baker ..................... | H03G 3/00 |

OTHER PUBLICATIONS

Prijs, M. et al "A Nearest Neighbour Approach to Predicting Survival Time with an Application in Chronic Respiratory Disease", Jul. 11, 2007.

Office Action issued on Chinese patent application No. 201610159114.X dated Mar. 15, 2019, 6 pages.

First Examination Report issued on Indian Patent Application 1342/CHE/2015 dated Sep. 8, 2020, 6 pages.

* cited by examiner

METHOD AND SYSTEM FOR PREDICTING EQUIPMENT FAILURE

RELATED APPLICATIONS

This application claims priority under 35 U.S.C. § 119 to Indian Application No. 1342/CHE/2015, filed Mar. 18, 2015, the contents of which are hereby incorporated by reference in their entirety.

BACKGROUND

Field

This application generally relates to systems that process sensor data associated with industrial equipment. In particular, this application describes a method and system for predicting equipment failure.

Description of Related Art

Large industrial operations, such as those used in oil and gas production, typically rely on a complex assortment of mechanical equipment and control systems for controlling and monitoring the performance of the mechanical equipment. To maximize production capacity, the equipment may be operated continuously and during extreme conditions. Operating the equipment under such conditions requires constant monitoring of the equipment to verify that the equipment is operating within its safety margins. For example, in the case of a pump, sensors may be arranged on the pump to measure the output pressure of the pump. Other sensors may be provided for measuring the temperature of the pump housing, the temperature of impeller bearings of the pump, the vibration of the pump, etc.

A local control system may continuously monitor the sensor data and may generate a user interface that allows an operator to view data indicative of the performance of the equipment and/or equipment failure. In some instances, the sensor data is communicated to a remote operations center that may be monitoring the performance of equipment located in various regions of the world. For example, in the case of oil production, a remote operations center may monitor the performance of equipment on various oil rigs located in different oceans.

However, despite constant monitoring, unexpected equipment failure may still occur, which may lead to production downtime. Such unplanned downtime can result in millions of dollars in production losses and unpredictability in meeting supply demands. For example, the average cost associated with an unplanned downtime of a mid-sized liquefied natural gas plant due to unplanned downtime is $150 M/yr.

BRIEF SUMMARY

In one aspect, a method for predicting equipment failure is provided. The method includes receiving parameter sample values associated with parameters of benchmark equipment and operational status information associated with the benchmark equipment. The parameter sample values and operational status information are periodically acquired. The method also includes generating a model that relates one or more of the parameters to benchmark equipment failure. For each of the one or more parameters, a threshold value at which an output of the model indicates benchmark equipment failure is determined. Next, parameters of an equipment under test having at least some parameter sample values associated with the parameters that match the determined threshold values are determined. For each determined parameter, the method further includes determining benchmark equipment having parameter sample values that match the parameter sample values of the equipment under test. Survivability data for the equipment under test is generated based on survivability data associated with the determined benchmark equipment. The generated survivability data is communicated to a user interface.

In a second aspect, a system for communicating product development information is provided. The system includes data reception hardware configured to receive parameter sample values associated with parameters of benchmark equipment and operational status information associated with the benchmark equipment. The parameter sample values and operational status information are periodically acquired. The system also includes an analytics hardware module configured to generate a model that relates one or more of the parameters to benchmark equipment failure. For each of the one or more parameters, analytics hardware module is configured to determine a threshold value at which an output of the model indicates benchmark equipment failure. The analytics hardware module is further configured to determine parameters of an equipment under test for which at least some parameter sample values associated with the parameters match the determined threshold values and, for each determined parameter, determine benchmark equipment having parameter sample values that match the parameter sample values of the equipment under test. The analytics hardware module generates survivability data for the equipment under test based on survivability data associated with the determined benchmark equipment. The system also includes a user interface server configured to receive the generated survivability data from the analytics hardware module; generate a user interface that includes a survivability chart to facilitate visualization of the survivability data, and to communicate the user interface to a terminal.

In a third aspect, a non-transitory machine-readable storage medium is provided. The non-transitory machine-readable storage medium has computer code stored thereon for predicting equipment failure. The code section is executable by a machine for causing the machine to receive parameter sample values associated with parameters of benchmark equipment and operational status information associated with the benchmark equipment, wherein the parameter sample values and operational status information are periodically acquired. The code causes the machine to generate a model that relates one or more of the parameters to benchmark equipment failure and, for each of the one or more parameters, determine a threshold value at which an output of the model indicates benchmark equipment failure. The code cause the machine to determine parameters of an equipment under test for which at least some parameter sample values associated with the parameters match the determined threshold values, determine benchmark equipment having parameter sample values that match the parameter sample values of the equipment under test. The code further causes the machine to generate survivability data for the equipment under test based on survivability data associated with the determined benchmark equipment; and communicate the generated survivability data to a user interface.

DETAILED DESCRIPTION

To overcome the problems described above, various embodiments of a method and system for predicting equipment failure are described below. Generally, historical sensor data associated with various parameter values of benchmark equipment is processed to generate survivability data associated with the benchmark equipment. As used herein, the term benchmark equipment corresponds to one or more pieces of equipment that are of a same type for which sensor data and an operational state (i.e., working or failed) is known. For example, the benchmark equipment may correspond to one or more pumps that have the same model number.

The historical sensor data may define parameter values of the benchmark equipment sampled continuously at a given rate. For example, parameter values of the benchmark equipment may be sampled every minute, hour, or at a different interval to obtain a steady stream of parameter values that facilitates determining how the parameters of the benchmark equipment change over time. The operational state at each sample may be provided to facilitate determining the state of the parameters around the time of equipment failure.

The historical sensor data is utilized to generate a model function that relates the parameter values of the benchmark equipment to the operational state of the benchmark equipment. As described in more detail below, the model function is then utilized to determine whether parameters of equipment under test are operating at dangerous levels (i.e., levels at which a failure is predicted to occur). If such parameters are found, the historical sensor data is searched to identify benchmark equipment having similar parameter values. The survivability of the identified benchmark equipment is utilized to determine the survivability of the equipment under test. The determined survivability is utilized to predict the failure probability of the equipment under test.

In some implementations, the method and system may be realized as a service to operators of industrial equipment. For example, the system may generate an interface through which an operator may register with the service. The operator may specify information that uniquely identifies equipment to be evaluated. The historical sensor data may include the sensor data associated with the operator-specified equipment. After registration, the operator may login to the system to observe failure probability information associated with the equipment.

Figure 1:
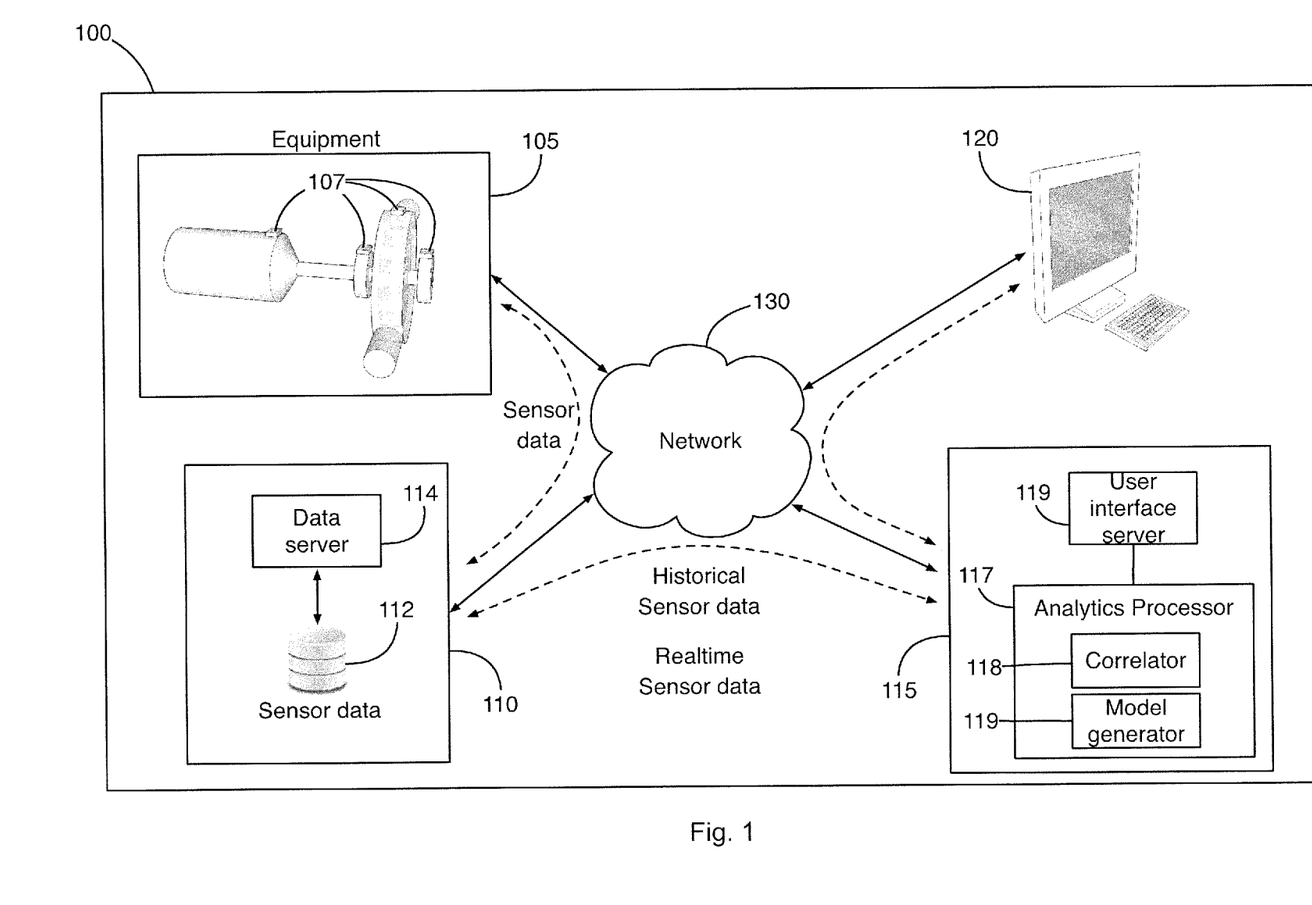
FIG. 1 illustrates an exemplary environment in which a system for predicting equipment failure may operate.

FIG. 1 illustrates an exemplary environment 100 in which a system 115 for predicting equipment failure may operate. Illustrated is an exemplary piece of equipment 105 that is under test or being evaluated, a data collection system 110, the system 115 for predicting equipment failure. Also illustrated are a network connection 130 to facilitate communicating information between the illustrated items and a user terminal 120 through which an operator may view information generated by the system 115, or adjust parameters of the system 115.

The equipment under test (EUT) 105 may correspond, for example, to a newly or recently installed pump on an oil rig. One or more sensors 107 may be strategically arranged around the EUT 105 to measure various parameters of the EUT 105. For example, a first sensor may measure the temperature of a drive motor. A second sensor may measure the output pressure of the pump. Sensors for measuring the temperature of one or more bearings may be provided. Other sensors may be provided for measuring other characteristics of the EUT 105.

Each sensor 107 may be configured to periodically sample a respective parameter of the EUT 105 and to communicate the information directly or indirectly to the data collection system 110. For example, each sensor 107 may be wirelessly communicated with or be wired to a local system near the EUT 105 that stores sensor data. The local system may periodically communicate the information to the data collection system 110. In other implementations, the sensors 107 may communicate sensor data directly to the data collection system 110.

The data collection system 110 corresponds to a system configured to collect sensor data from any number and types of equipment. For example, the data collection system 110 may correspond to data collection system operated and maintained by OSIsoft®. Data collected by the data collection system 110 may be stored in a database 112 of the data collection system 110. The data collection system 110 may include a data server 114 or other type of server configured to facilitate access to the data stored in the database 112. For example, a web server configured to generate web pages to facilitate access to the data in the database 112 may be provided. The web server may implement a web services interface to allow for automated retrieval of the data by other computer systems, such as the system 115. Other interfaces, such as FTP or a different interface, may be provided.

Data collected by the data collection system 110 may come from a variety of sources such as different operators, companies, etc., which may be using a wide array of different types of equipment. This advantageously increases the size of the pool of benchmark equipment with which a given EUT 105 may be compared. For example, a single operator may not have operated the EUT 105 long enough for any meaningful reliability data to be generated, whereas the data may be available from other operators who have been using the same type of equipment for a longer time.

Table 1 represents a portion of sensor data that may be associated with a specific piece of exemplary benchmark equipment that may be stored in the database 112. The exemplary benchmark equipment may correspond to a pump that has operated for a time, failed, been serviced, and then been placed back into operation one or more times.

TABLE 1

| Sample time | Operational status | Suction pressure | Discharge valve temp | P3 | ... | PN |
|---|---|---|---|---|---|---|
| T1 | 1 | 89.49350739 | 91.16438293 | ... | ... | ... |
| T2 | 1 | 89.44112396 | 91.1349411 | ... | ... | ... |
| T3 | 0 | 80.96361542 | 107.7796631 | ... | ... | ... |
| T4 | 1 | 89.28088379 | 92.35906982 | ... | ... | ... |
| T5 | 1 | 88.79036713 | 90.75217438 | ... | ... | ... |
| T6 | 1 | 89.2430954 | 89.2430954 | ... | ... | ... |
| T7 | 0 | 80.62102509 | 107.5643921 | ... | ... | ... |
| T8 | 1 | 89.38102722 | 90.84050751 | ... | ... | ... |
| TN | 1 | 89.2433954 | 89.2434954 | | | |

Each row of the table includes the values for various exemplary parameters along with an indication of the operational status of the equipment that existed at a given point in time (i.e., T1, T2, etc.). The period of time represented between rows may be minutes, hours, days, or a different interval. The operational status may correspond to a Boolean value such as 1 or 0 that represents whether the equipment was operating at the time the data was sampled. The exemplary suction pressure parameter may, for example, correspond to the suction pressure measured at the output of the equipment at the time the data was sampled. Similarly, the discharge valve temperature may correspond to the temperature of the fluid flowing from the equipment at the time the data was sampled. P3 . . . Pn correspond to the values of a multitude of other parameters of the equipment that may be monitored such as various pressure and temperature measurements taken from other parts of the equipment, vibration measurements, etc.

The system 115 may include an analytics processor 117 configured to receive and process sensor data stored in the data collection system 110 that is associated with benchmark equipment and an EUT 105, and to generate data for predicting the probability of failure of the EUT 105. In this regard, the analytics processor 117 may correspond to one or more interconnected ASICs, FPGAs, or other types of hardware with circuit blocks configured to perform various operations needed to predict the probability of failure of the EUT 105. For example, one or more custom ASICs, FPGAs, or other types of circuits configured to perform correlation analysis 118 and/or regression modeling 119 may be provided. In other implementations, the analytics processor 117 may correspond to or include a computer processor for performing one or more of the operations. The computer processor may correspond to an Intel®, AMD®, PowerPC® processor, or a different processor. The computer processor may execute an operating system, such as a Microsoft Windows®, Linux, Unix® or a different operating system.

The user interface server 119 is configured to generate one or more user interface screens that allow an operator at a terminal 120 to view the results of the analytics processor 117, and to adjust various parameters of the EUT 105 to perform a "what if" scenario, as described below. The user interface server 119 may correspond to a web server, in which case the user interface screens may correspond to web pages that are communicated to a web browser running on the terminal 120.

Figure 2A:
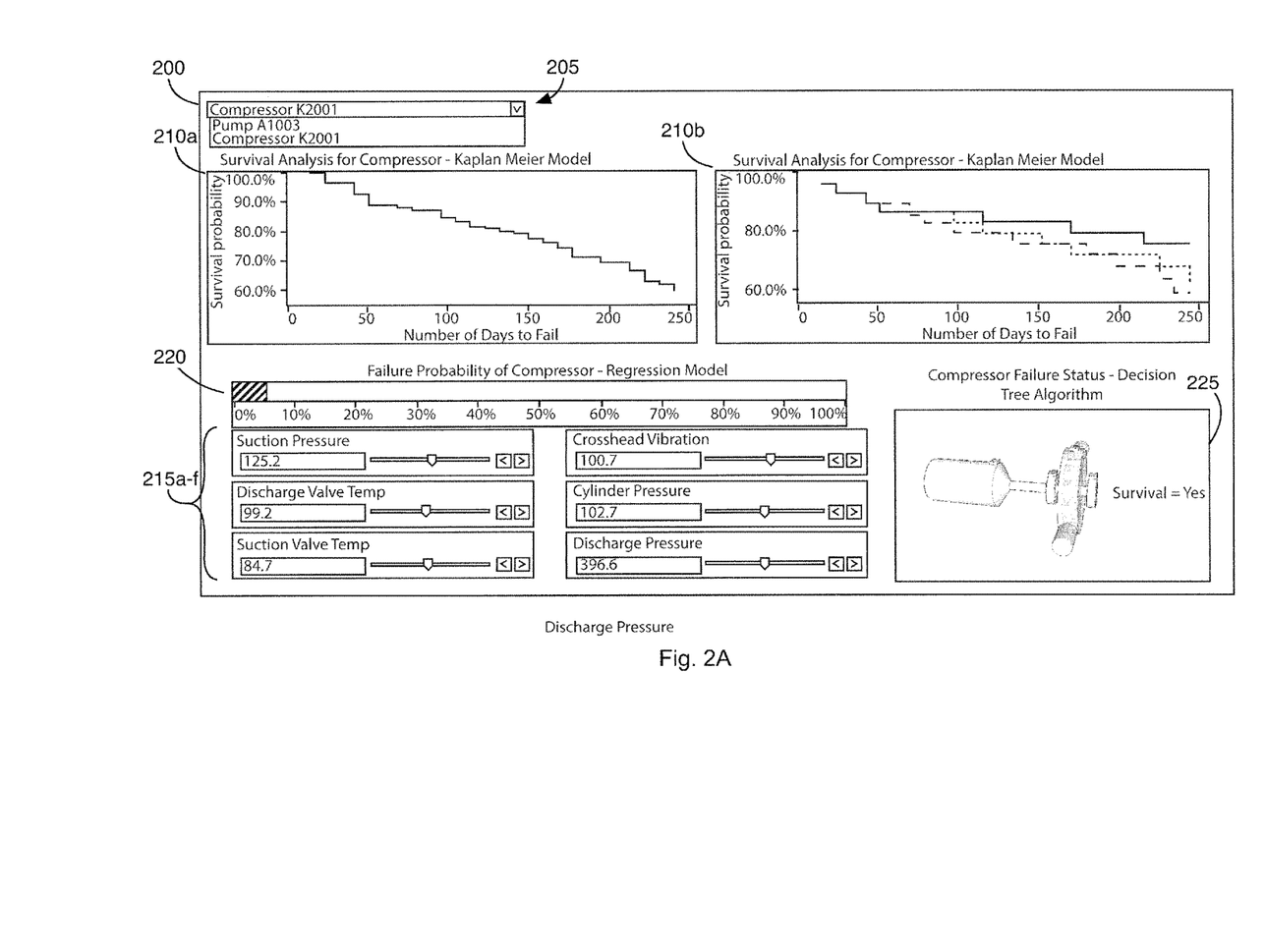
FIGS. 2A-C illustrate different stages of an exemplary user interface that may be generated by the user interface server.
Figure 2B:
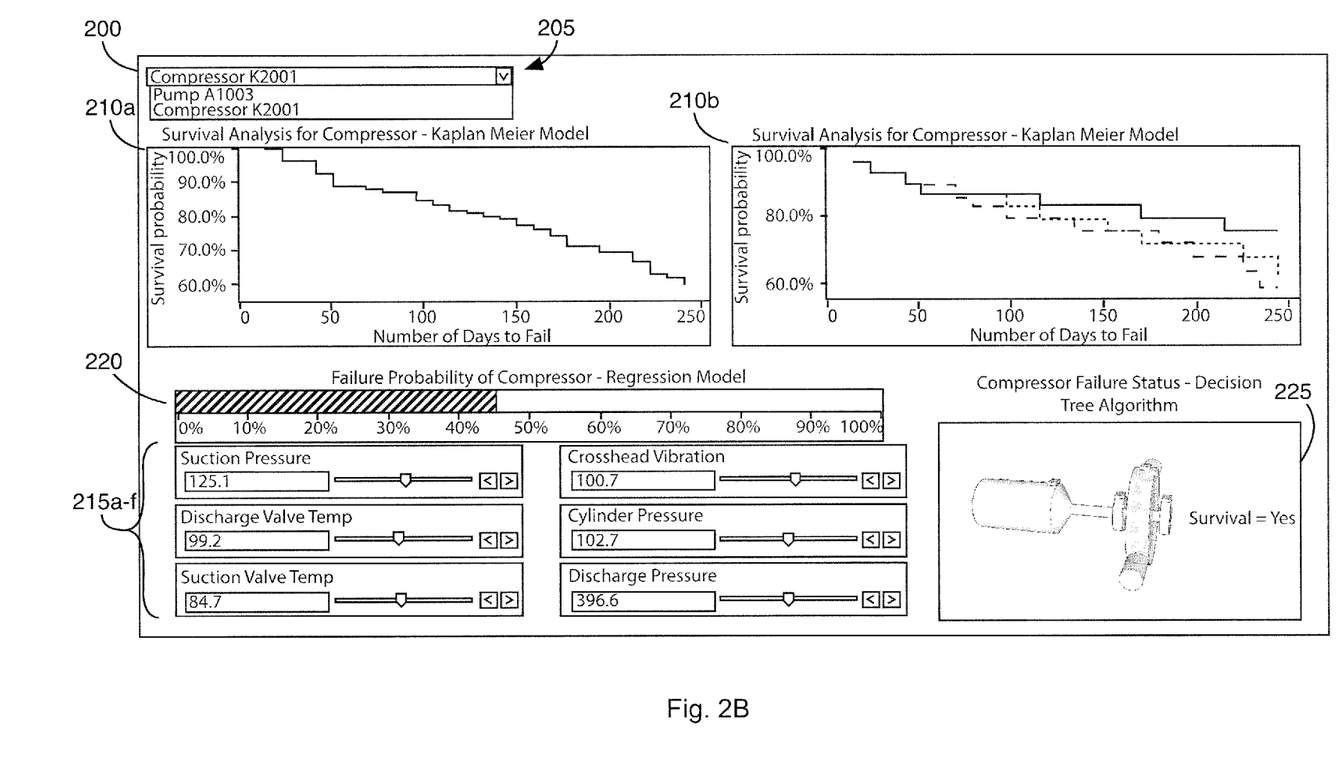
Figure 2C:
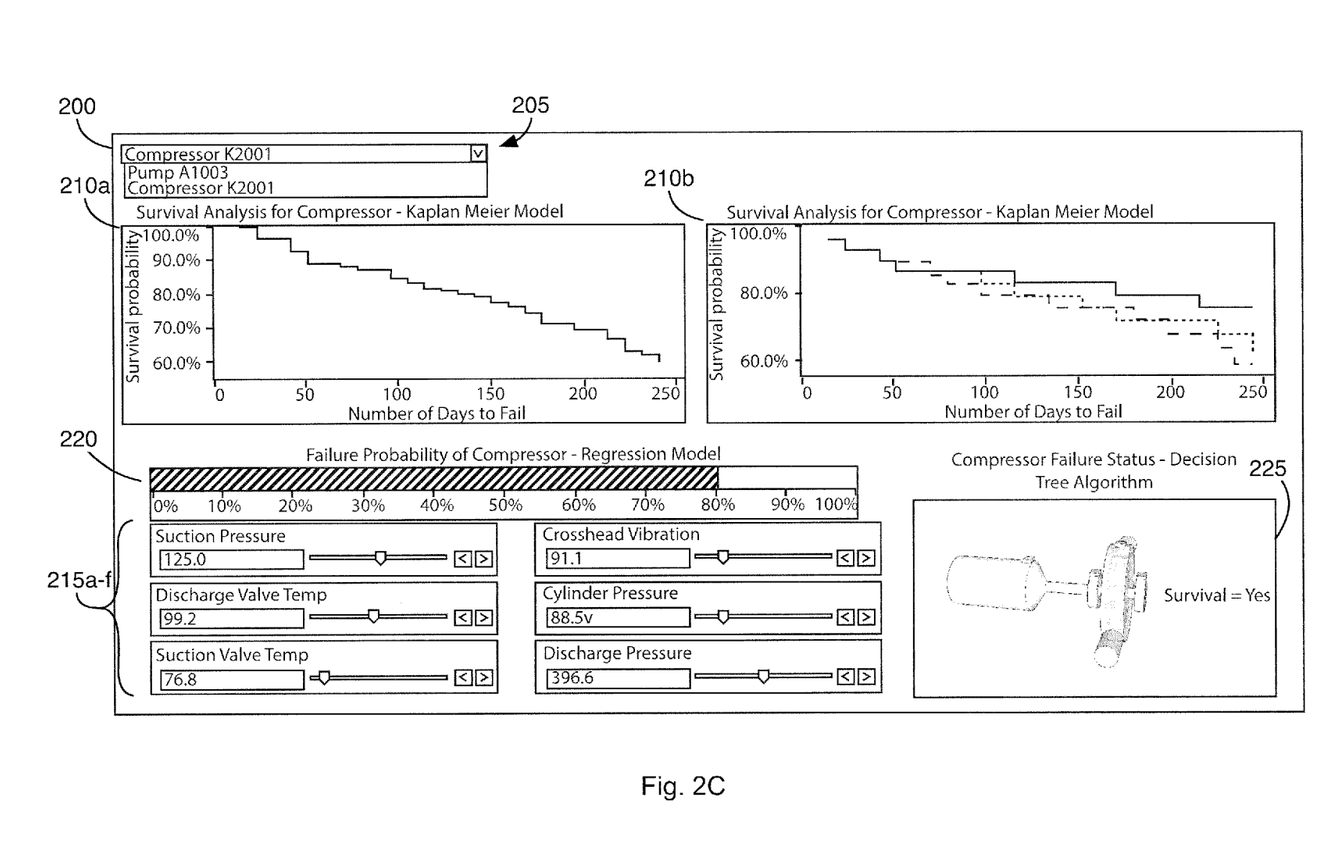

FIGS. 2A-C illustrate different stages of an exemplary user interface 200 that may be generated by the user interface server 119. Referring to FIG. 2, the user interface 200 includes an equipment selection control 205 for selecting an EUT for which a failure probability prediction is desired. Upon selection of an EUT 105, the user interface 200 is configured to display first and second survival analysis charts 210ab. The user interface 200 also includes one or more parameter adjustment controls 215a-f and a failure probability indicator 220. In some implementations, the user interface 200 may include a control 225 for displaying an image corresponding to the EUT. The image may indicate the status of the EUT, such as whether the EUT is predicted to survive.

The survival analysis charts 210ab depict the survival probability of the EUT 105 as a function of the number of days the EUT 105 has been or will be in operation. The data relied upon for generation of the survival analysis may be generated by the analytics processor 117, as described below. The data that defines the survival analysis of the EUT 105 is generally determined based upon the survival analysis of benchmark equipment having similar operating characteristics as the EUT 105. The survival analysis of the benchmark equipment may be estimated via a survival function estimator such as the Kaplan-Meier estimator. For example, the information in Table 1 may be processed by such an estimator to produce a survival chart, such as the charts 210ab depicted in FIGS. 2A-C. The estimator may consider the time a sample is acquired (i.e., T1, T2, etc.), and the operational status of the benchmark equipment at the time the sample was acquired in generating survival data.

The parameter adjustment controls 215a-f correspond to those parameters of the EUT 105 that are more likely to have a correlation with the probability of failure of the EUT 105 than others. The parameter adjustment controls 215a-f may be defaulted to the current parameter values of the EUT 105. For example, if the value of the suction parameter of an EUT 105 operating in the field is 125.2 PSI, the suction pressure adjustment control 215a may be defaulted to 125.2 PSI.

The probability of failure of the EUT 105 associated with a particular combination of parameter values, as set by parameter adjustment controls 215a-f, is conveyed via the failure probability indicator 220. For example, the failure probability indicator 220 in FIG. 2A indicates a failure probability of about 5% based on the combination of the values of the parameter adjustment controls 215a-f depicted in FIG. 2A. Similarly, the failure probability indicator 220 in FIGS. 2B and 2C indicate a failure probability of about 45% and about 80%, respectively, based on the combination of the values of the parameter adjustment controls 215a-f illustrated in the respective figures. While a progress bar type control is illustrated in the figures as conveying the failure probability, it is understood that other types of visual controls may be utilized to depict the failure probability such pie charts and the like.

Operations of the system 115 are described with reference to the block diagrams illustrated in FIGS. 3-5. Some or all of the operations may be implemented via instruction code that resides on non-transitory computer readable storage media of the system 110. Execution of the instruction code by, for example, the analytics processor 117 and/or the user interface sever 119 of the system 110 may cause the system 110 to perform the operations described in the block diagrams. In addition or alternatively, some or all of the operations may be performed by dedicated hardware, such as the correlation analysis block 118 and regression modeling 119 block illustrated in FIG. 1.

Figure 3:
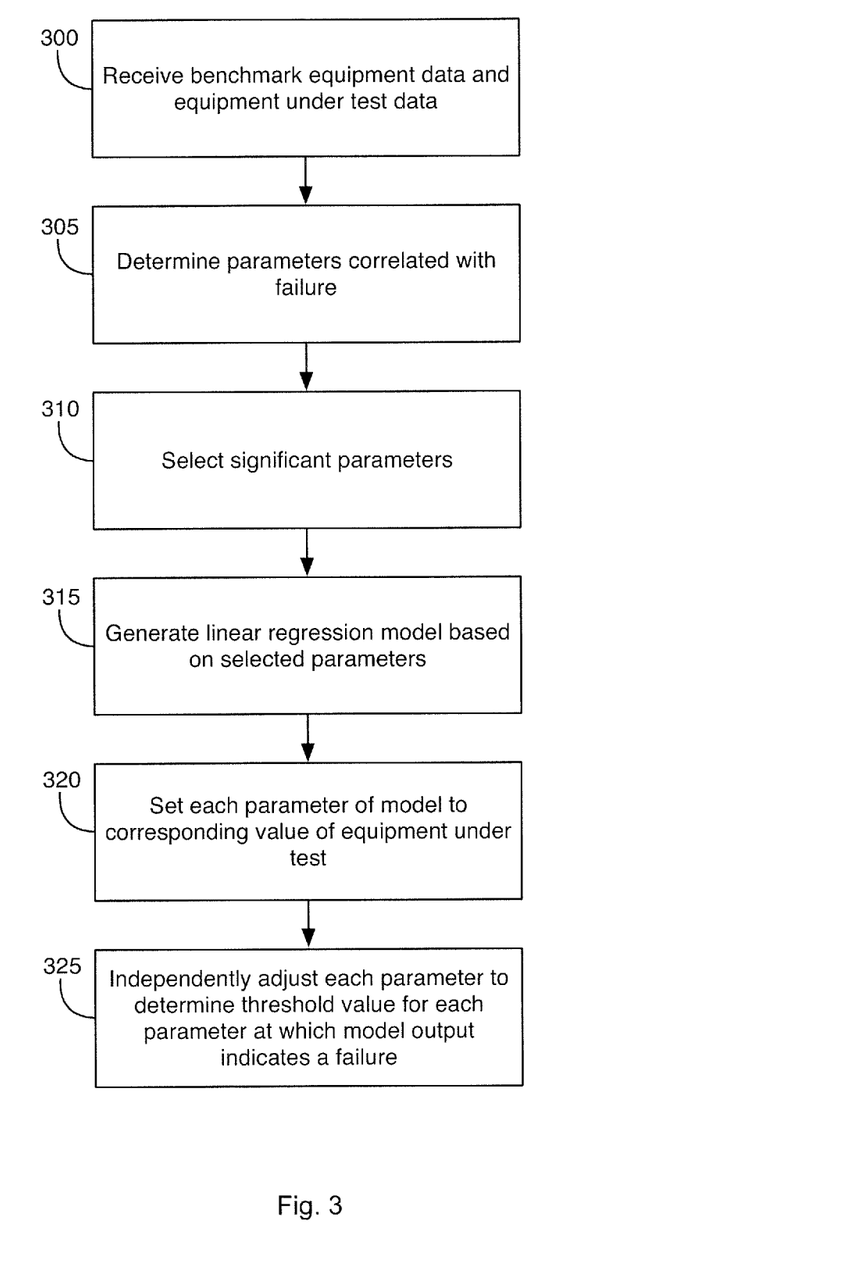
FIGS. 3 and 4 illustrate a group of exemplary operations that may be performed by the system in determining survivability data for equipment under test.

Referring to FIG. 3, at block 300, equipment data may be received. For example, a particular type of EUT 105 such as a specific type of pump (i.e., a particular model number) located at an industrial complex may be selected via the equipment selection control 205 of the user interface 200. The analytics processor 117 may request and receive benchmark equipment parameter sample values such as those depicted in Table 1 from the data collection system 110. For example, in the case of a specific pump model, the parameter sample values may be associated with one or more pumps of the same model type. The pumps may reside within industrial complexes of the operator and/or may be in operation at industrial complexes operated by others.

In addition to receiving benchmark equipment parameter sample values, parameter sample values of the EUT 105 may be received from the data collection system 110, or directly from the EUT 105. The parameter sample values of the EUT 105 may correspond to real-time values that represent the current state of the parameter values of the EUT 105.

At block 305, the parameter sample values of the benchmark equipment are analyzed to identify those parameters having the highest correlation with the operating status of the benchmark equipment. For example, the value of a particular temperature measurement of the pump may be determined to have little significance on the operational status of the equipment whereas the value of a particular pressure may have a high degree of significance.

The correlation between each parameter and the operational status may be determined via a formula for determining the correlation coefficient between each parameter of the benchmark equipment and the operational status of the benchmark equipment such as the Pearson product-moment correlation coefficient formula. In this case, a correlation coefficient of +1 indicates a perfect direct linear relationship or correlation between the parameter and the operational status. A correlation coefficient of −1 indicates a perfect inverse linear relationship or anti-correlation, between the parameter and the operational status. A correlation coefficient of zero indicates that there is no correlation between the parameter and the operational status. The parameters determined to be the most correlated with the operational status may correspond to those for which the absolute magnitude of the correlation coefficient exceeds a threshold, such a 0.5.

At blocks 310 and 315, the parameter values associated with the parameters determined to have the highest correlation with the operational status of the benchmark equipment are utilized to generate a model function that models the operational status of the benchmark equipment as a function of the parameter values. For example, the model may correspond to a linear regression model, which has the form $Y=\beta_1 X_1+\beta_2 X_2+\beta_3 X_3+\ldots+\beta_N X_N$, where Y represents the operational status of the benchmark equipment, $X_1-X_N$ correspond to the parameter values associated with parameters 1–N, which in turn correspond to the parameters most correlated with the operational status of the benchmark equipment. $\beta_{1-N}$ corresponds to coefficients that are determined so as to fit the model to the data associated with the benchmark equipment. The model, or more precisely the coefficients, may be generated using a tool such as the statistical computing and graphics programming language R, which includes programming instructions for generating a linear regression model of the form above based on a data set, such as the data or a subset of the data illustrated in Table 1. The output value of the model function may be any number between zero and one, inclusive.

At block 320, the parameter values $X_1-X_N$ of the model function are set to the corresponding parameter values of the EUT 105.

At block 325, each parameter value, $X_1-X_N$, is independently adjusted to determine a threshold value at which the output of the model function indicates a failure probability above a threshold. That is, the values are adjusted to determine so-called worse-case values that, according to the model function, would cause a piece of equipment that behaves just like the model to fail. For example, the threshold may be set to one, which indicates a 100% probability of error, 0.75, which indicates a 75% probability of error, or a different threshold.

Figure 4:
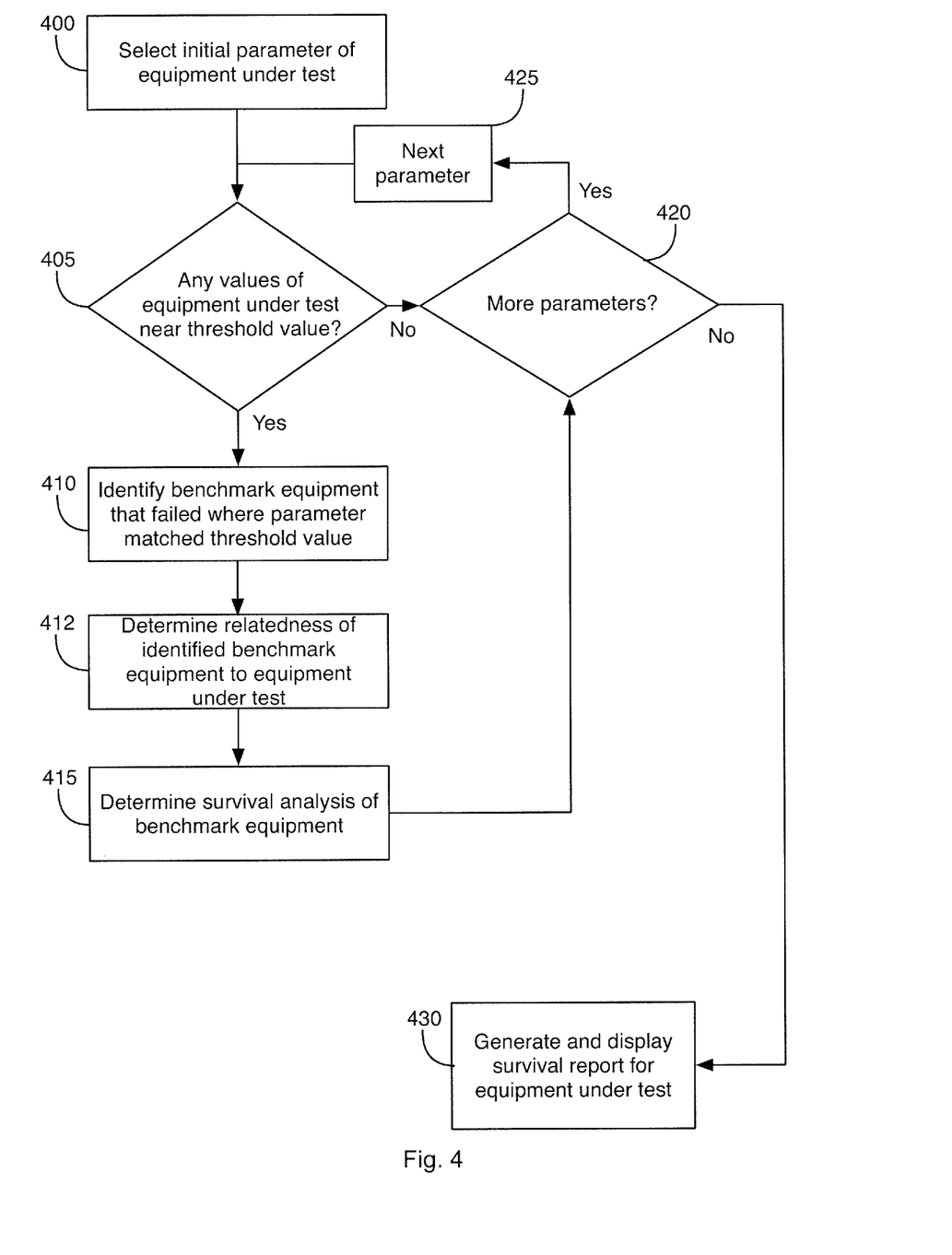

Referring to FIG. 4, a first parameter of the EUT 105 is selected at block 400. The first parameter corresponds to one of the input parameters of the model described above. At block 405, parameter values associated with the selected parameter are searched to determine whether any of the values are within the range of the threshold value for the parameter determined above at block 325. For example, parameter values of the selected parameter that fall within, for example, +−10% of the threshold value may be determined to fall within the range of the threshold value. A different manner for determining the range may be utilized.

If at block 405 no parameter values are determined to fall within the threshold range, then at block 420, if there are additional parameters to evaluate, the next parameter is selected at block 425, and the operation at 405 repeats. In this way, the parameter values associated with the parameters of the model are evaluated against the respective threshold values determined above.

If at block 405 parameter values are found that fall within the threshold range, then at block 410, parameter values associated with benchmark equipment are searched to identify whether one or more pieces of benchmark equipment have corresponding parameter values that fall within the same threshold.

At block 412, for each piece of benchmark equipment identified at block 405, the relatedness of the benchmark equipment to the EUT 105 is determined by determining the amount of overlap that exists between the parameter values associated the selected parameter of the EUT 105 and the corresponding parameter values associated with the identified piece of benchmark equipment. The amount of overlap may be determined, for example, by performing a K nearest neighbor (KNN) algorithm in which the Euclidian distance between the parameter values of the EUT 105 and the benchmark equipment is determined. When the Euclidian distance between a given parameter value of the EUT 105 and a parameter value of the benchmark equipment is less than a pre-determined threshold, the two instances of parameter values are determined to be similar or related. The relatedness between the EUT 105 and the benchmark equipment is determined to increase as the number of parameter values between the two that are closer than the pre-determined threshold increases.

At block 415, for each piece of benchmark equipment determined to be related at block 412, a survivability analysis is performed on the parameter values of the benchmark equipment to generate survivability data. The survivability data may be generated via a survival function estimator such as the Kaplan-Meier estimator, as described above. For example, the survivability data may be generated via the R tool mentioned earlier. Sample data related to each identified piece of benchmark equipment may be processed by the survival function to produce survival data for each piece of equipment determined to be related.

At block 420, if there are no more parameters to evaluate, then at block 430, survivability data may be generated for the EUT 105 based on the survivability data of the one or more pieces of benchmark equipment determined to be related at block 412. For example, the survivability data for the EUT 105 may correspond to a weighted average of the survivability data of each piece of benchmark equipment determined to be related. The weighting may be based on the relative relatedness between the EUT 105 and a given piece of benchmark equipment. For example, the weighting may be higher for a first piece of benchmark equipment that has a high relatedness, and lower for a second piece of benchmark equipment that has relatedness lower than the first piece of equipment.

After generating the survivability data for the EUT 105, a chart such as the survivability chart 210a illustrated in FIG. 2A may be generated. For example, survivability data generated within the R tool at block 420 may be communicated via a data visualization tool such as Tableau®, which provides user interactive dash-boarding capabilities along with controls for generating reports, charts, graphs, etc., for creating a user interface such as the user interfaces illustrated in FIG. 2A. The user interactive dashboard may be represented in an HTML format and provided via, for example, a SharePoint portal hosted on a cloud service such as Microsoft Azure®. Such a service allows a registered operator to access the HTML formatted dashboard via a terminal 120 with a web browser. In some implementations, a second survivability chart 210*b* may be generated to illustrate upper and lower survivability estimates for the EUT 105.

Figure 5:
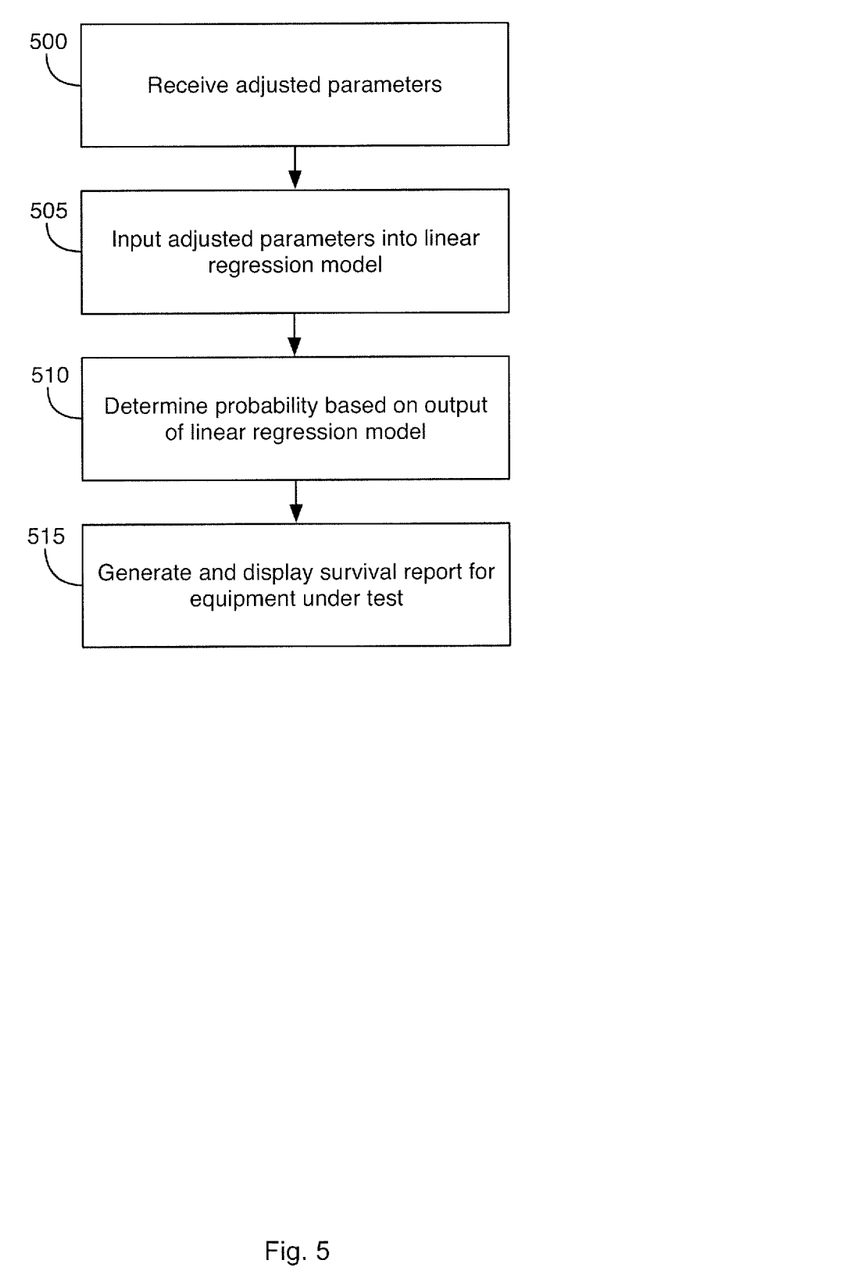
FIG. 5 illustrates a group of exemplary operations that may be performed by the system in determining the failure probability of the equipment under test.

The operations illustrated in FIG. 5 relate to predicting the failure probability of the EUT 105 and displaying the result in the failure probability indicator 220 of the user interface 200.

At block 500, the parameter values specified in the parameter adjustment controls 215*a-f* may be adjusted by an operator. The parameter values may have initially been defaulted to the parameter values of the current operating parameter values of the EUT 105.

At block 505, the adjusted parameter values are inputted? into the model generated above in block 315. As noted above, an output value of zero may indicate that the probability of failure is zero and output value of one may indicate a 100% probability of failure. Various combinations of parameter values may result in the model generating an output value between zero and one, inclusive.

At block 510, the probability of failure of the EUT 105 under the combination of parameter values specified by the operator may be determined based on the output of the model. For example, an output value of 0.8 may correspond to an 80% chance of equipment failure, as illustrated in FIG. 2A. An output values of 0.7 or 0.3 may correspond to a 70% and 30% chance of equipment failure, as illustrated in FIGS. 2B and 2C.

At block 515, after calculating the probability of failure, the failure probability indicator 220 may be updated to reflect the calculated value. In some implementations, the color of the probability indicator 220 may be changed to alert an operator to an increased possibility of failure.

Figure 6:
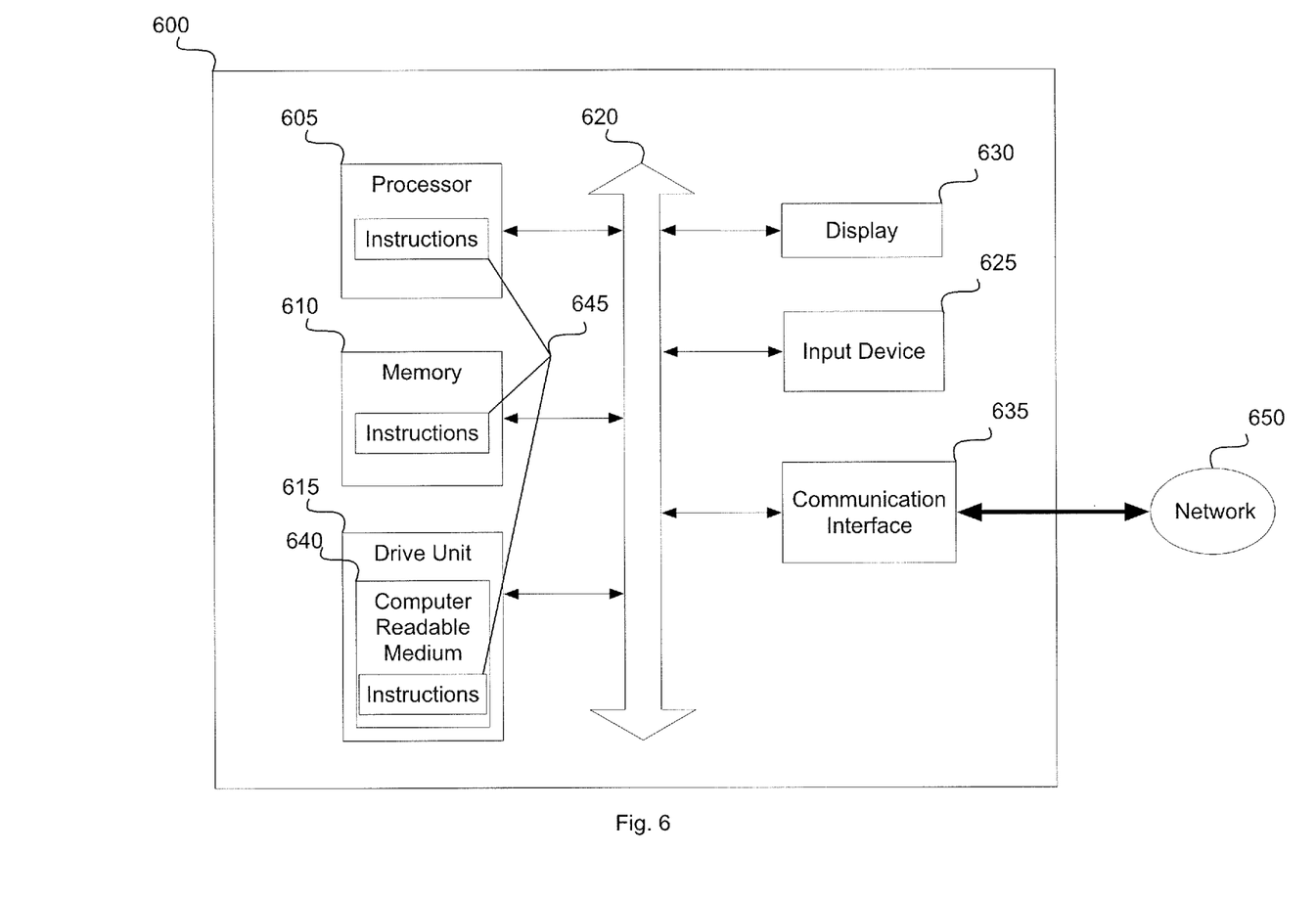
FIG. 6 illustrates a computer system that may implement various modules of system.

FIG. 6 illustrates a computer system 600 that may form part of or implement the system 115 such as the analytics processor 117, the user interface server 119, and/or any other module referenced herein. The computer system 600 may include a set of instructions 645 that the processor 605 may execute to cause the computer system 600 to perform any of the operations described above. The computer system 600 may operate as a stand-alone device or may be connected, e.g., using a network, to other computer systems or peripheral devices.

In a networked deployment, the computer system 600 may operate in the capacity of a server or as a client-user computer in a server-client user network environment, or as a peer computer system in a peer-to-peer (or distributed) network environment. The computer system 600 may also be implemented as or incorporated into various devices, such as a personal computer or a mobile device, capable of executing the instructions 645 (sequential or otherwise) that specify actions to be taken by that machine. Further, each of the systems described may include any collection of sub-systems that individually or jointly execute a set, or multiple sets, of instructions to perform one or more computer functions.

The computer system 600 may include one or more memory devices 610 on a bus 620 for communicating information. In addition, code operable to cause the computer system to perform any of the operations described above may be stored in the memory 610. The memory 610 may be a random-access memory, read-only memory, programmable memory, hard disk drive or any other type of memory or storage device.

The computer system 600 may include a display 630, such as a liquid crystal display (LCD), a cathode ray tube (CRT), or any other display suitable for conveying information. The display 630 may act as an interface for the user to see the functioning of the processor 605, or specifically as an interface with the software stored in the memory 610 or in the drive unit 615.

Additionally, the computer system 600 may include an input device 625, such as a keyboard or mouse, configured to allow a user to interact with any of the components of system 600.

The computer system 600 may also include a disk or optical drive unit 615. The disk drive unit 615 may include a computer-readable medium 640 in which the instructions 645 may be stored. The instructions 645 may reside completely, or at least partially, within the memory 610 and/or within the processor 605 during execution by the computer system 600. The memory 610 and the processor 605 also may include computer-readable media as discussed above.

The computer system 600 may include a communication interface 635 to support communications via a network 650. The network 650 may include wired networks, wireless networks, or combinations thereof. The communication interface 635 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for predicting equipment downtime based on information from the equipment, the method comprising:
receiving parameter sample values associated with parameters of benchmark equipment and operational status information associated with the benchmark equipment, wherein the parameter sample values and operational status information are periodically acquired;

generating a model that relates a plurality of parameters to benchmark equipment failure;

for each of the plurality of parameters, determining a threshold value at which an output of the model indicates benchmark equipment failure;

receiving sensor data from the equipment that is associated with the plurality of parameters of the benchmark equipment;

selecting an initial parameter of the equipment under test from the determined parameters of the equipment under test;

for iteration:
   determining, based on parameter sample values associated with the selected parameter, whether any of the parameter sample values associated with the selected parameter is within the determined threshold value;
   if it is determined that the any of the parameter samples values associated with the selected parameter is within the determined threshold value, then identifying, based on the parameter sample values associated with the parameters of the benchmark equipment, the benchmark equipment having a corresponding parameter sample value that matches the determined threshold value;
   for the selected parameter, determining the parameter sample values of the benchmark equipment matching the parameter sample values of the equipment under test;
   generating survivability data for the benchmark equipment based on survivability data associated with the determined benchmark equipment; and
   after the survivability data is generated or if it is determined that none of the parameter sample values associated with the selected parameter is within the determined threshold value, then determining whether more parameters of the equipment under test are to be selected for evaluation;
if it is determined that the more parameters are to be selected, then selecting a next parameter and repeating the iteration;
if it is determined that the more parameters are not to be selected, then exiting the iteration and generating a user interface that includes:
   a first section that illustrates a graph of the generated survivability data;
   a second section that illustrates a plurality of user interface elements for each of the plurality of parameter fields that correspond to a top N number of parameters having an absolute magnitude value of a correlation coefficient greater than or equal to a predetermined threshold, wherein the absolute magnitude value of the correlation coefficient 1 indicates a linear correlation between the parameters and a probability of failure of the equipment under test, and the absolute magnitude value of the correlation coefficient 0 indicates no correlation between the parameters and the probability of failure of the equipment under test, wherein each user interface element displays:
      a parameter name associated with the corresponding parameter;
      a parameter value associated with the corresponding parameter, wherein the parameter value is initially set to a value associated with the sensor data received from the equipment that is associated with the corresponding parameter; and
      a control that facilitates adjustment of the parameter value associated with the corresponding parameter;
      an indicator showing the probability of failure of the equipment under test that is adjusted corresponding to a user manipulation of the control, wherein a user changes the parameter value using the control; and
   a third section that illustrates a predicted reliability of the equipment under test in a binary format, and illustrates an image of the equipment under test;
displaying the user interface;
subsequently receiving a user update to a control of one of the plurality of user interface elements to thereby update the parameter value associated with the control; and
dynamically updating the survivability data and predicted reliability included on the displayed user interface based on the user updated parameter value while the user updates the control;
wherein the dynamically updating includes:
   receiving, via the user interface, a combination of updated parameter values for the plurality of parameters of the model;
   inputting the combination of updated parameter values into the model;
   determining the probability of failure of the equipment under test based on an output value of the model; and
   communicating the determined probability to the user interface for display in the third section of the user interface.

2. The method according to claim 1, further comprising:
correlating the parameter sample values associated with parameters of benchmark equipment with the operational status information of benchmark equipment to determine one or more of the plurality of parameters having a greatest relationship to the operational status of the benchmark equipment; and
wherein the one or more parameters related to the benchmark equipment failure by the model correspond to those parameters having a correlation higher than a predetermined threshold.

3. The method according to claim 1, wherein the generated model corresponds to a linear regression model.

4. The method according to claim 1, wherein determining benchmark equipment having parameter sample values related to the parameter sample values of the equipment under test that match the determined threshold values comprises: comparing the parameter sample values of the equipment under test that match the determined threshold values with parameters sample values of the benchmark equipment via a K nearest neighbor (KNN) algorithm.

5. The method according to claim 4, wherein when a Euclidean distance between the parameter sample values of the equipment under test that match the determined threshold values and the parameter sample values of the benchmark equipment is below a threshold, the parameter sample values of the benchmark equipment are determined to match the parameter sample values of the equipment under test.

6. The method according to claim 1, wherein the benchmark equipment and the equipment under test are a same type of equipment.

7. A system for predicting equipment downtime based on information from the equipment, the system comprising:
  data reception hardware configured to receive parameter sample values associated with parameters of benchmark equipment and operational status information associated with the benchmark equipment, wherein the parameter sample values and operational status information are periodically acquired;
  an analytics hardware module configured to:
    generate a model that relates a plurality of parameters to benchmark equipment failure;
    for each of the plurality of parameters, determine a threshold value at which an output of the model indicates benchmark equipment failure;
    receive sensor data from the equipment that is associated with the plurality of parameters of the benchmark equipment;
    select an initial parameter of the equipment under test from the determined parameters of the equipment under test;
    for iteration:
      determine, based on parameter sample values associated with the selected parameter, whether any of the parameter sample values associated with the selected parameter is within the determined threshold value;
      if it is determined that the any of the parameter samples values associated with the selected parameter is within the determined threshold value, then identify, based on the parameter sample values associated with the parameters of the benchmark equipment, the benchmark equipment having a corresponding parameter sample value that matches the determined threshold value;
      for the selected parameter, determine the parameter sample values of the benchmark equipment matching the parameter sample values of the equipment under test;
      generate survivability data for the equipment under test based on survivability data associated with the determined benchmark equipment; and
      after the survivability data is generated or if it is determined that none of the parameter sample values associated with the selected parameter is within the determined threshold value, then determine whether more parameters of the equipment under test are to be selected for evaluation; and
      if it is determined that the more parameters are to be evaluated, then select a next parameter and repeat the iteration;
  a user interface server configured to:
    receive the generated survivability data from the analytics hardware module;
    if it is determined by the analytics hardware module that the more parameters are not to be selected, then exit the iteration and generate a user interface that includes:
      a first section that illustrates a graph of the generated survivability data;
      a second section that illustrates one or more user interface elements for each of the plurality of parameter fields that correspond to a top N number of parameters having an absolute magnitude value of a correlation coefficient greater than or equal to a predetermined threshold, wherein the absolute magnitude value of the correlation coefficient 1 indicates a linear correlation between the parameters and a probability of failure of the equipment under test, and the absolute magnitude value of the correlation coefficient 0 indicates no correlation between the parameters and the probability of failure of the equipment under test, wherein each user interface element displays:
        a parameter name associated with the corresponding parameter;
        a corresponding parameter value associated with the corresponding parameter, wherein the parameter value is initially set to a value associated with the sensor data received from the equipment that is associated with the corresponding parameter; and
        a control that facilitates adjustment of the parameter value associated with the corresponding parameter;
        an indicator showing the probability of failure of the equipment under test that is adjusted corresponding to a user manipulation of the control, wherein a user changes the parameter value using the control; and
      a third section that illustrates a predicted reliability of the equipment under test in a binary format, and illustrates an image of the equipment under test;
    communicate the user interface to a terminal;
      subsequently receive a user update to a control of one of the plurality of user interface elements to thereby update the parameter value associated with the control; and
      dynamically update the survivability data and predicted reliability included on the user interface based on the user updated parameter value while the user updates the control;
  wherein the user interface server is further configured include a plurality of user controls on the user interface for specifying a combination of parameter values for the plurality of parameters;
  wherein the analytics hardware module is further configured to:
    input the plurality of parameters values into the model;
    determine the probability of failure of the equipment under test based on an output value of the model; and
  wherein the user interface server is further configured to communicate the determined probability to the third section of the user interface.

8. The system according to claim 7, wherein the analytics hardware module further comprises a correlation hardware module configured to correlate the parameter sample values associated with parameters of benchmark equipment with the operational status information of benchmark equipment to determine one or more parameters having a greatest relationship to the operational status of the benchmark equipment; and
  wherein the one or more parameters related to the benchmark equipment failure by the model correspond to those parameters having a correlation higher than a predetermined threshold.

9. The system according to claim 7, wherein the generated model corresponds to a linear regression model and the analytics hardware module further includes model generator hardware that implements the linear regression model.

10. The system according to claim 7, wherein determining benchmark equipment having parameter sample values related to the parameter sample values of the equipment under test that match the determined threshold values comprises: comparing the parameter sample values of the equipment under test that match the determined threshold values with parameters sample values of the benchmark equipment via a K nearest neighbor (KNN) algorithm.

11. The system according to claim 10, wherein when a Euclidean distance between the parameter sample values of the equipment under test that match the determined threshold values and the parameter sample values of the benchmark equipment is below a threshold, the parameter sample values of the benchmark equipment are determined to match the parameter sample values of the equipment under test.

12. The system according to claim 7, wherein the benchmark equipment and the equipment under test are a same type of equipment.

13. A non-transitory machine-readable storage medium having stored thereon a computer program comprising at least one code section for predicting equipment downtime based on information from the equipment, the at least one code section being executable by a machine for causing the machine to perform acts of:
  receiving parameter sample values associated with parameters of benchmark equipment and operational status information associated with the benchmark equipment, wherein the parameter sample values and operational status information are periodically acquired;
  generating a model that relates a plurality of parameters to benchmark equipment failure;
  for each of the one or more parameters, determining a threshold value at which an output of the model indicates benchmark equipment failure;
  receiving sensor data from the equipment that is associated with the plurality of parameters of the benchmark equipment;
  selecting an initial parameter of the equipment under test from the determined parameters of the equipment under test;
  for iteration:
    determining, based on parameter sample values associated with the selected parameter, whether any of the parameter sample values associated with the selected parameter is within the determined threshold value;
    if it is determined that the any of the parameter samples values associated with the selected parameter is within the determined threshold value, then identifying, based on the parameter sample values associated with the parameters of the benchmark equipment, the benchmark equipment having a corresponding parameter sample value that matches the determined threshold value;
    for the selected parameter, determining the parameter sample values of the benchmark equipment matching the parameter sample values of the equipment under test;
    generating survivability data for the benchmark equipment based on survivability data associated with the determined benchmark equipment; and
    after the survivability data is generated or if it is determined that none of the parameter sample values associated with the selected parameter is within the determined threshold value, then determining whether more parameters of the equipment under test are to be selected for evaluation;
    if it is determined that the more parameters are to be selected, then selecting a next parameter and repeating the iteration;
    if it is determined that the more parameters are not to be selected, then exiting the iteration and generating a user interface that includes:
      a first section that illustrates a graph of the generated survivability data;
      a second section that illustrates a plurality of user interface elements for each of a plurality of parameter fields that correspond to a top N number of parameters having an absolute magnitude value of a correlation coefficient greater than or equal to a predetermined threshold, wherein the absolute magnitude value of the correlation coefficient 1 indicates a linear correlation between the parameters and a probability of failure of the equipment under test, and the absolute magnitude value of the correlation coefficient 0 indicates no correlation between the parameters and the probability of failure of the equipment under test, wherein each user interface element displays:
        a parameter name associated with the corresponding parameter;
        a corresponding parameter value associated with the corresponding parameter, wherein the parameter value is initially set to a value associated with the sensor data received from the equipment that is associated with the corresponding parameter; and
        a control that facilitates adjustment of the parameter value associated with the corresponding parameter;
        an indicator showing the probability of failure of the equipment under test that is adjusted corresponding to a user manipulation of the control,
      wherein a user changes the parameter value using the control; and
      a third section that illustrates a predicted reliability of the equipment under test in a binary format, and illustrates an image of the equipment under test;
    displaying the user interface;
    subsequently receiving a user update to a control of one of the one or more user interface elements to thereby update the parameter value associated with the control; and
    dynamically updating the survivability data and predicted reliability included on the user interface to based on the user updated parameter value while the user updates the control;
    wherein the dynamically updating includes:
      receiving, via the user interface, a combination of updated parameter values for the plurality of parameters of the model;
      inputting the combination of updated parameter values into the model;
      determining the probability of failure of the equipment under test based on an output value of the model; and
      communicating the determined probability to the user interface for display in the third section of the user interface.

14. The non-transitory machine-readable storage according to claim 13, further comprising:
  correlating the parameter sample values associated with parameters of benchmark equipment with the operational status information of benchmark equipment to determine one or more parameters having a greatest relationship to the operational status of the benchmark equipment; and wherein the one or more parameters related to the benchmark equipment failure by the model correspond to those parameters having a correlation higher than a predetermined threshold.

15. The non-transitory machine-readable storage according to claim 13, wherein the generated model corresponds to a linear regression model.

16. The non-transitory machine-readable storage according to claim 13, wherein determining benchmark equipment having parameter sample values related to the parameter sample values of the equipment under test that match the determined threshold values comprises: comparing the parameter sample values of the equipment under test that match the determined threshold values with parameters sample values of the benchmark equipment via a K nearest neighbor (KNN) algorithm.

17. The non-transitory machine-readable storage according to claim 16, wherein when a Euclidean distance between the parameter sample values of the equipment under test that match the determined threshold values and the parameter sample values of the benchmark equipment is below a threshold, the parameter sample values of the benchmark equipment are determined to match the parameter sample values of the equipment under test.

18. The non-transitory machine-readable storage according to claim 13, wherein the benchmark equipment and the equipment under test are a same type of equipment.

* * * * *